(12) United States Patent
Chen et al.

(10) Patent No.: US 12,445,286 B2
(45) Date of Patent: Oct. 14, 2025

(54) CYBER SECURITY METHOD AND SYSTEM BASED ON MULTI-PARTY AND MULTI-FACTOR DYNAMIC STRONG ENCRYPTION AUTHENTICATION

(71) Applicant: EverMore Technology Inc., Hsinchu (TW)

(72) Inventors: Yuan-Sheng Chen, Hsinchu (TW); Wu-Hsiung Huang, Hsinchu (TW); Tsu-Pin Weng, Hsinchu (TW); Jia-You Jiang, Hsinchu (TW); Wen-Hsing Kuo, Hsinchu (TW); Yin-Te Tsai, Hsinchu (TW)

(73) Assignee: EverMore Technology Inc., Hsinchu (TW)

( * ) Notice: Subject to any disclaimer, the term of this patent is extended or adjusted under 35 U.S.C. 154(b) by 184 days.

(21) Appl. No.: 18/231,329

(22) Filed: Aug. 8, 2023

(65) Prior Publication Data
US 2024/0267224 A1    Aug. 8, 2024

(30) Foreign Application Priority Data

Feb. 4, 2023  (TW) ................................ 112104021

(51) Int. Cl.
*H04L 29/06* (2006.01)
*H04L 9/08* (2006.01)
*H04L 9/32* (2006.01)

(52) U.S. Cl.
CPC .......... *H04L 9/3213* (2013.01); *H04L 9/0869* (2013.01); *H04L 9/3226* (2013.01); *H04L 9/3247* (2013.01)

(58) Field of Classification Search
CPC ... H04L 9/3213; H04L 9/0869; H04L 9/3226; H04L 9/3247; H04L 9/0863; H04L 63/0428; H04L 63/0807
See application file for complete search history.

(56) References Cited

U.S. PATENT DOCUMENTS

| | | | |
|---|---|---|---|
| 9,485,098 B1 * | 11/2016 | Lepeshenkov | G06F 21/62 |
| 10,461,939 B2 * | 10/2019 | Church | H04L 63/0853 |
| 11,102,004 B2 * | 8/2021 | Wang | H04W 12/02 |
| 11,405,387 B1 * | 8/2022 | Griffin | H04L 9/0866 |

(Continued)

FOREIGN PATENT DOCUMENTS

AU    2002246210 C1 *  9/2002  ........... H04L 9/3218

*Primary Examiner* — Shawnchoy Rahman
(74) *Attorney, Agent, or Firm* — Demian K. Jackson; Jackson IPG PLLC

(57) ABSTRACT

The present invention relates to a cyber security method, which includes: in a first device: randomly generating an ephemeral decryption key (EDK) in response to an input of an authentication information (AI); transmitting the EDK to a third device and retrieving a token index (TI) from the third device; encrypting an ID info to generate an electronic digital signature (EDS) based on a part of the EDK to generate an authentication token (AT) accordingly; and combining the AI, the ID info, the TI and the AT to form an ephemeral string and sending the ephemeral string to a second device; and in the second device: acquiring the AI, the ID info, the TI and the AT by parsing the ephemeral string and requesting to retrieve the EDK from the third device based on the TI; and decrypting the AT and verifying the EDS based on the EDK.

10 Claims, 6 Drawing Sheets

(56) References Cited

U.S. PATENT DOCUMENTS

| | | | | |
|---|---|---|---|---|
| 2017/0171200 | A1* | 6/2017 | Bao | H04L 9/3213 |
| 2020/0344058 | A1* | 10/2020 | Wang | H04L 9/3213 |
| 2020/0382305 | A1* | 12/2020 | Wimberley | H04L 9/30 |
| 2021/0377044 | A1* | 12/2021 | Leibmann | H04L 9/3247 |
| 2024/0305462 | A1* | 9/2024 | Weng | H04L 9/3213 |

* cited by examiner

500

In the user equipment: randomly generating an ephemeral decryption key in response to an input of an authentication information (STEP 501)

↓

Transmitting the ephemeral decryption key to a security serving equipment and retrieving a token index from the security serving equipment (STEP 502)

↓

Encrypting an identity information to generate an electronic digital signature based on a part of the ephemeral decryption key to generate an authentication token accordingly (STEP 503)

↓

Combining the authentication information, the identity information, the token index and the authentication token selectively to form an ephemeral string and sending the ephemeral string to a second device (STEP 504)

↓

In the network application serving device: acquiring the authentication information, the identity information, the token index and the authentication token by receiving and parsing the ephemeral string and requesting to retrieve the ephemeral decryption key from the third device based on the token index (STEP 505)

↓

Decrypting the authentication token and verifying the electronic digital signature based on the ephemeral decryption key (STEP 506)

FIG. 6

CYBER SECURITY METHOD AND SYSTEM BASED ON MULTI-PARTY AND MULTI-FACTOR DYNAMIC STRONG ENCRYPTION AUTHENTICATION

CROSS-REFERENCE TO RELATED APPLICATION

This application claims priority benefit to Taiwan Invention Patent Application Serial No. 112104021, filed on Feb. 4, 2023, in Taiwan Intellectual Property Office, the entire disclosures of which are incorporated by reference herein.

FIELD

The present invention relates to a cyber security method and system, in particular to a cyber security method and system based on multi-party and multi-factor dynamic strong encryption authentication.

BACKGROUND

In the current state of the art, the current information and communication technology (ICT) industry is advancing at a rapid pace; however, cyber security threats are also evolving at almost the same pace, on the contrary. In today's online world, a new type of cyber security threat may suddenly appear at any time, which brings significant security challenges to the ICT industry.

Due to the high potential returns after success, these cyber threats tend to focus on stealing users' account credentials, including username and password, to illegally gain unauthorized access to online services, especially to hack into financial-type online services. Cyber security threats classified in this type include some commonly seen patterns, which are enumerated as follows.

The most commonly seen patterns include phishing scams through text messages or emails aimed at stealing users' login information or credentials, resulting in losses of deposits for people; and the large-scale distributed denial-of-service (DDoS) attacks on the infrastructure for online services, targeting industries covering, such as finance and insurance, trade and sales, information and communication, and manufacturing, etc. In the coming future, the spread of ransomware is also a significant threat to business.

There are also some other types of cyber security threats, including: hackers infiltrating directly into users' devices or network application service providers' ASP servers to steal users' account information, repeatedly stuffing and then brute-force cracking the username and password by using superior high-speed computing power, and implanting various types of malware such as Trojan horse programs on users' devices through free adware software bundled on users' devices to steal users' credentials, etc. In the field of cyber security, the traditional login authentication mode based on username and password verification is no longer secure. It is not news that the user's account information is stolen.

In the face of these emerging complex and diverse threats, many traditional ICT security defense measures, such as, Public Key Infrastructure (PKI), HTTPS based on SSL/TLS, Key Distribution Center (KDC), Multi-factor Authentication (MFA), and Single Sign-On (SSO) mechanisms, are yet insufficient to address these emerging cyber security threats as well.

Hence, there is a need to solve the above deficiencies/issues.

SUMMARY

The present invention relates to a cyber scecurity method and system, in particular to a cyber security method and system based on multi-party and multi-factor dynamic strong encryption authentication.

Accordingly, the present invention provides a cyber security method. The method includes: in a first device: randomly generating an ephemeral decryption key in response to an input of an authentication information; transmitting the ephemeral decryption key to a third device and retrieving a token index from the third device; encrypting an identity information to generate an electronic digital signature based on a part of the ephemeral decryption key to generate an authentication token accordingly; and combining the authentication information, the identity information, the token index and the authentication token selectively to form an ephemeral string and sending the ephemeral string to a second device; and in the second device: acquiring the authentication information, the identity information, the token index and the authentication token by receiving and parsing the ephemeral string and requesting to retrieve the ephemeral decryption key from the third device based on the token index; and decrypting the authentication token and verifying the electronic digital signature based on the ephemeral decryption key.

The present invention further provides a cyber security system. The system includes: a third device; a first device configured to: randomly generate an ephemeral decryption key in response to an input of an authentication information; transmit the ephemeral decryption key to a third device and retrieve a token index from the third device; encrypt an identity information to generate an electronic digital signature based on a part of the ephemeral decryption key to generate an authentication token accordingly; and combine the authentication information, the identity information, the token index and the authentication token selectively to form an ephemeral string and send the ephemeral string to a second device; and the second device configured to: acquire the authentication information, the identity information, the token index and the authentication token by receiving and parsing the ephemeral string and request to retrieve the ephemeral decryption key from the third device based on the token index; and decrypt the authentication token and verify the electronic digital signature based on the ephemeral decryption key.

The present invention further provides a cyber security system. The system includes: a fourth device comprising a second device programing module and a third device programing module; a first device communicatively connected with the fourth device and configured to: randomly generate an ephemeral decryption key in response to an input of an authentication information; transmit the ephemeral decryption key to a third device programing module and retrieve a token index from the third device programing module; encrypt an identity information to generate an electronic digital signature based on a part of the ephemeral decryption key to generate an authentication token accordingly; and combine the authentication information, the identity information, the token index and the authentication token selectively to form an ephemeral string and send the ephemeral string to a second device; and the fourth device configured to acquire the authentication information, the token index or the authentication token by parsing the ephemeral string by the second device programming module; request to retrieve the ephemeral decryption key from the third device programming module based on the token index by the second device programming module; and decrypt the authentication token and verify the electronic digital signature based on the ephemeral decryption key by the second device programming module.

The above content described in the summary is intended to provide a simplified summarization for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation according to the present invention and many of the attendant advantages thereof are readily obtained as the same become better understood by reference to the following detailed description when considered in connection with the accompanying drawing, wherein:

FIG. 6 is a flow chart illustrating multiple implementation steps for implementing the cyber security method based on multi-party and multi-factor dynamic strong encryption authentication according to the present invention.

DETAILED DESCRIPTION

Figure 1:
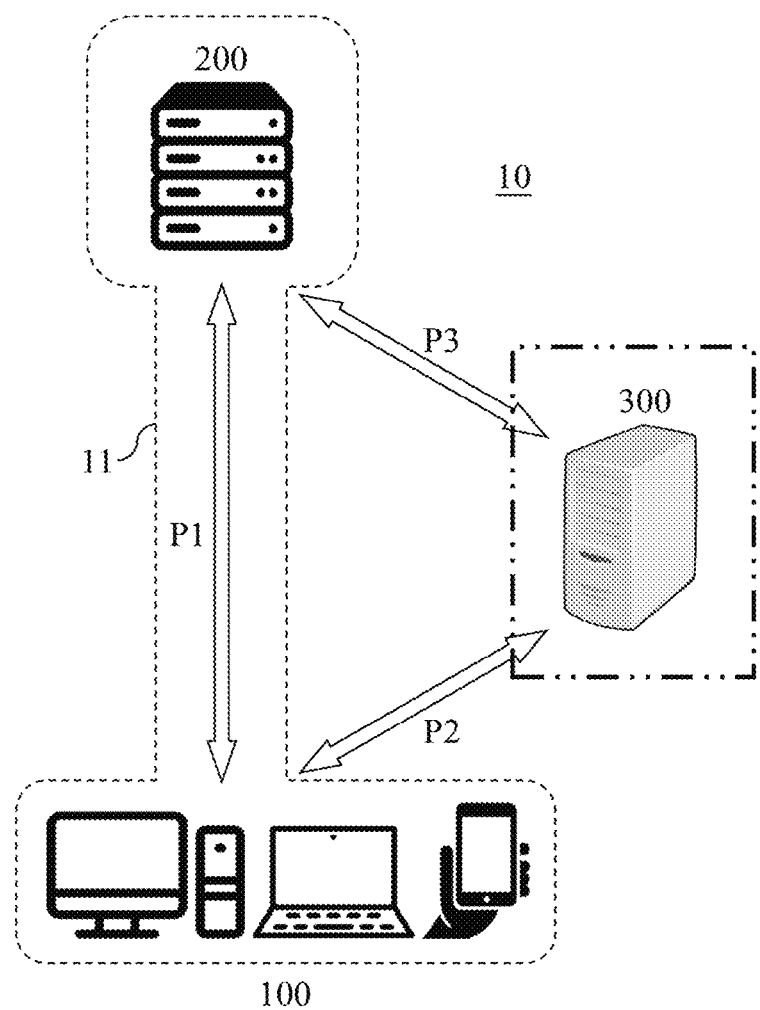
FIG. 1 is a system architecture diagram illustrating the first embodiment for the cyber security system based on multi-party and multi-factor dynamic strong encryption authentication according to the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice. It is clear that other embodiments can be configured according to the knowledge of persons skilled in the art without departing from the true technical teaching of the present disclosure, the claimed disclosure being limited only by the terms of the appended claims.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

FIG. 1 is a system architecture diagram illustrating the first embodiment for the cyber security system based on multi-party and multi-factor dynamic strong encryption authentication according to the present invention. The cyber security system 10 based on multi-party and multi-factor dynamic strong encryption authentication according to the present invention is implemented jointly by the participation of multi-party devices and equipment, and includes at least a user equipment (the first device) 100 operated by the user, a network application serving device (the second device) 200 and a security serving equipment (the third device) 300. Communication links and transmission connections with one another among the three devices 100, 200 and 300 are established typically via, including but not limited to, the Internet for exchanging messages and information, etc.

The user equipment 100 is preferably a terminal device commonly used by an ordinary consumer, including but not limited to, a desktop computer, a notebook computer, a smart phone and a tablet device, etc. The security serving equipment 300 is preferably a security intermediary server or a cloud server.

The network application serving device 200 preferably covers two types of devices. The first-type device is an Internet application server that provides Internet applications, including but not limited to an ASP server, an ICP server, an ISP server, a virtual machine server, a serverless Lambda function device, a CAN bus main node or a factory main node, etc. The second-type device is a network device (networking hardware) that builds a network and acts as an intermediary for data transmission between various network nodes, including but not limited to a small cell, a router, a hub, a switch, a bridge, a gateway, a brouter, a relay repeater, an edge server, a microcontroller unit (MCU), an automated teller machine (ATM), a point of sale machine (POS), a PC-workstation, a machine tool, a programmable logic controller (PLC), a drone, an IP cam, a satellite phone, a CAN bus node, and an IP share machine (network address translation, NAT), etc., on a network.

In one embodiment, the network application serving device 200 is preferably the first-type device of the Internet application server, such as an Internet contents provider server. The user equipment 100 preferably establishes a first transmission connection P1 with the network application serving device 200 over one or more segments of the network consisting of the local area network (LAN) or the Internet. The first transmission connection P1, a second transmission connection P2, and a third transmission connection P3 may preferably be an unencrypted, unsecured, or untrusted transmission connection. In one embodiment, the first transmission connection is preferably an out-of-band channel.

Figure 2:
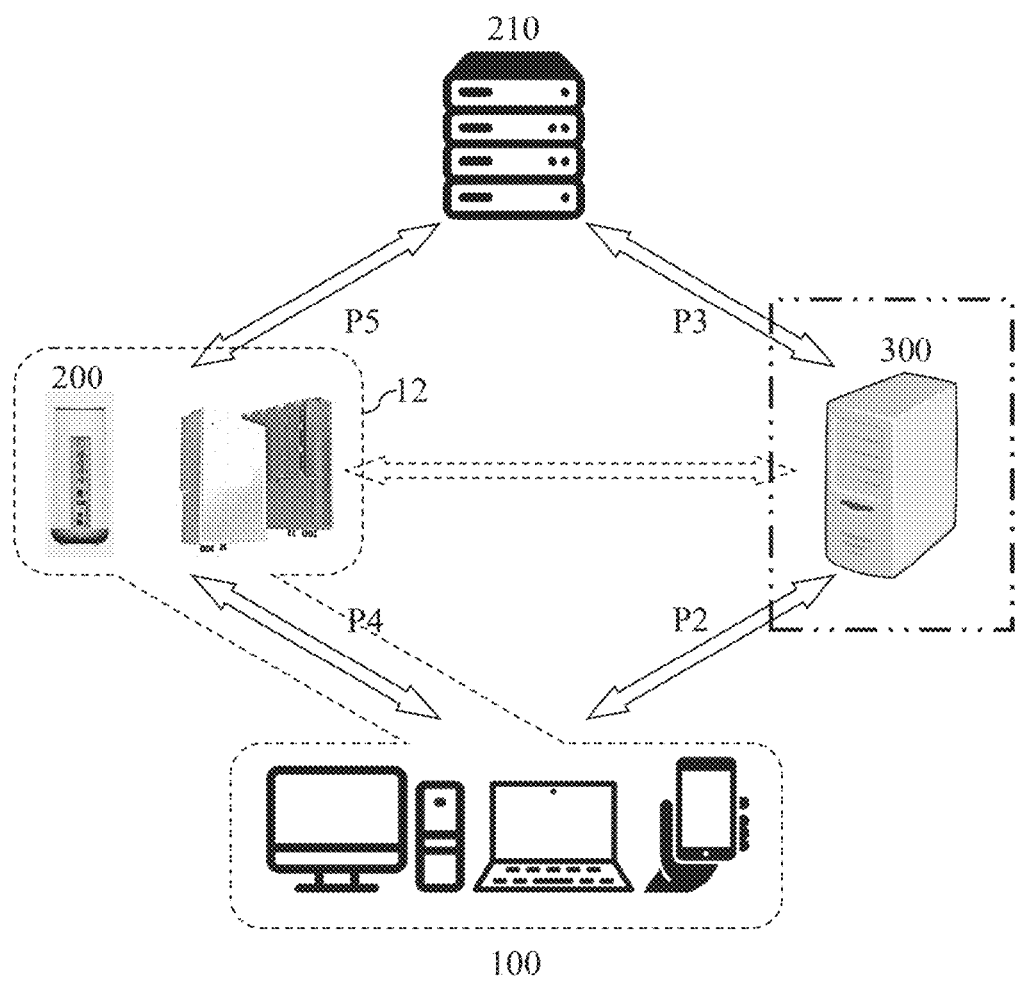
FIG. 2 is a system architecture diagram illustrating the second embodiment for the cyber security system based on multi-party and multi-factor dynamic strong encryption authentication according to the present invention.

FIG. 2 is a system architecture diagram illustrating the second embodiment for the cyber security system based on multi-party and multi-factor dynamic strong encryption authentication according to the present invention. The second embodiment is based on the first embodiment and contains all of the technical features described in the first embodiment. In one embodiment, the connection between the user equipment 100 and the network application server 210 passes through other network device(s). Therefore, in one embodiment, the network application serving device 200 is preferably the second-type device of network device, such as a home router or a 5G small cell. The user equipment 100 preferably communicates with the network application server 210 through the network application serving device 200 that is a network device. A fourth transmission connection P4, a fifth transmission connection P5, the second transmission connection P2 and the third transmission connection P3 may preferably be an unencrypted, unsecured, or untrusted transmission connection. The first transmission connection P1 includes the fourth transmission connection P4 and the fifth transmission connection P5. In one embodiment, the fourth transmission connection P4 and the fifth transmission connection P5 are preferably an out-of-band channel.

In the first and second embodiments, when a user wishes to log in to an Internet application, one user must first enter his or her own authentication information including a username and a password first, in order to pass the conventional username password authentication. The processes involved in the username password authentication are described as follows.

The user uses his or her user user equipment 100, such as a smart phone, and operates the front-end user interface or the front-end application program (App), which has been installed in the user equipment 100 and is provided by the network application serving device 200 or the network application server 210 via the Internet and established by, for example, PaaS or SaaS technologies, displayed in the smart phone to access the login interface, and opens and enters into the login interface by accessing the login interface provided via the Internet browser or the front-end App. Then the user inputs the correct username and password into the corresponding username and password field displayed in the login interface. The username and password information is immediately uploaded to the network application serving device 200 after being symmetrically encrypted by the transport layer security (SSL/TLS) protocol. Next, the user is allowed to log in to the web application service after authentication.

The entire login and authentication operation flows are implemented through the user equipment 100 and the network application serving device 200, which form subnetworks 11 and 12, and the first transmission connection P1 or the fourth transmission connection P4, which connects both the user equipment 100 and the network application serving device 200.

In general, to ensure the security and effectiveness of the above username/password authentication process, the user must keep his or her username and password properly in order to avoid personal data breaches. However, the above username password authentication process can still be easily hacked by at least the following methods, including but not limited to obtaining the username and password through phishing scams via text messages or phishing emails; intruding into the first transmission link P1 to intercept the username and password; hacking into the user equipment 100 or the network application serving device 200 to steal the username and password; and cracking the username and password through stuffing attacks, or stealing the username and password by implanting a Trojan program included in the front-end UI into the terminal.

In one embodiment, the cyber security method based on multi-party and multi-factor dynamic strong encryption authentication according to the present invention is implemented based upon the system architecture of the cyber security system 10 that is based on multi-party and multi-factor dynamic strong encryption authentication. In addition to the first transmission connection P1, the user equipment 100, and the network application serving device 200, an additional third-party security serving equipment 300 is added, and a second transmission connection P2 connecting the user equipment 100 and the security serving equipment 300 and a third transmission connection P3 connecting the network application serving device 200 and the security serving equipment 300 are added, as compared to the prior art.

In some embodiment, a first security middleware program module, a second security middleware program module, and a third security middleware program module are installed in the user equipment 100, the network application serving device 200, and the security serving equipment 300, respectively, so to execute the cyber security method based on multi-party and multi-factor dynamic strong encryption authentication according to the present invention.

Figure 3:
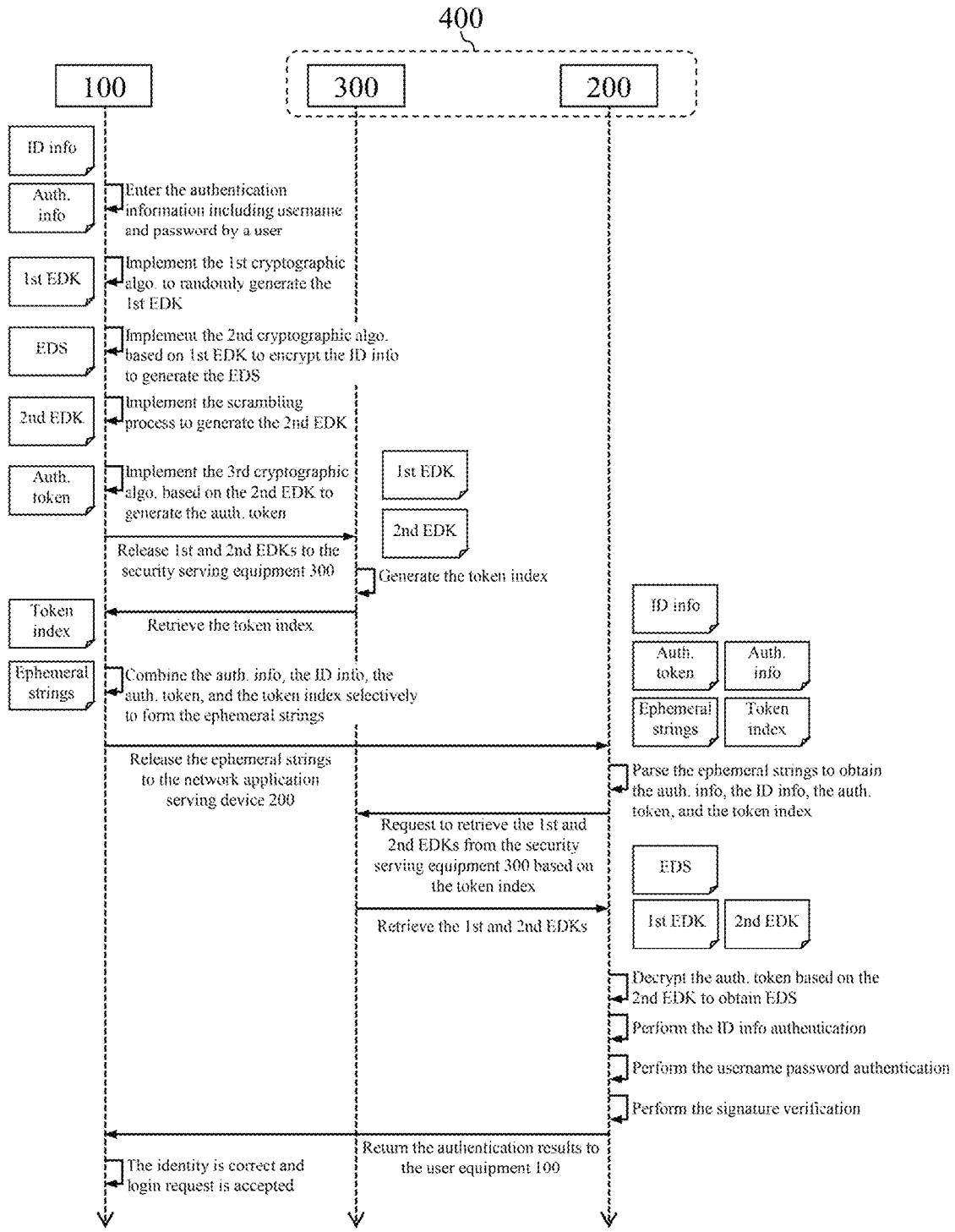
FIG. 3 is a sequence diagram illustrating the implementation processes of the third embodiment for the cyber security method based on multi-party and multi-factor dynamic strong encryption authentication according to the present invention.

FIG. 3 is a sequence diagram illustrating the implementation process of the third embodiment for the cyber security method based on multi-party and multi-factor dynamic strong encryption authentication according to the present invention. In the third embodiment, the network application serving device 200 and the security serving equipment 300 are integrated into the same one cloud server 400.

In one embodiment, the user first enters the authentication information into his or her own user equipment 100. For example, the user operates the front-end application program, such as the mobile app, installed on the smartphone and enters the login interface provided by the mobile app. Then, the user inputs the authentication information including username and password into the corresponding username and password field displayed in the login interface. The username and password entered by the user are transmitted from the user equipment 100 to the network application serving device 200 through the transmission connection P1 or the transmission connection P4.

When the above-mentioned login operation is detected, a first security middleware program module installed on the same user equipment 100 is activated in response to the input of the above-mentioned authentication information. After the first security middleware program module is executed, in one embodiment, an passcode input interface is selectively displayed on the touch display screen of the user equipment 100 to provide an passcode input field for the user to input a set of passcode. The first security middleware program module has a form that is preferably an SDK file or a callable API execution file.

In one embodiment, when a user enters his or her passcode into the passcode input field, the first security middleware program module uses the authentication information including the username, password or passcode entered by the user as the seed value in response to the input of the passcode, and implements the first cryptographic algorithm in the user equipment 100 to generate a first ephemeral decryption key (EDK) having a length of, for example, 32 bytes.

In one embodiment, when the user enters his or her passcode into the passcode input field, the first security middleware program module uses other non-fixed random values irrelevant or relevant to the username, password, or passcode as a seed value in response to the input of the passcode, and implements the first cryptographic algorithm in the user equipment 100 to randomly generate the first ephemeral decryption key (secret key) based on the seed value.

The first cryptographic algorithm is preferably an RSA algorithm, a DSA algorithm, an MD5 algorithm, an MD4 algorithm, an MD2 algorithm, an SHA-1 algorithm, an SHA-2 algorithm, an SHA-3 algorithm, a RIPEMD-160 algorithm, an MDC-2 algorithm, a GOST R 34.11-94 algorithm, a BLAKE2 algorithm, a Whirlpool algorithm, an SM3 algorithm, a PRNG algorithm, a TRNG algorithm, or a combination thereof. The first cryptographic algorithm is preferably used to generate the ephemeral decryption key and is also known as a key generation algorithm or an encryption key generation algorithm.

After the first ephemeral decryption key is generated in the user equipment 100, a second cryptographic algorithm based on the first ephemeral decryption key is implemented in the user equipment 100 to encrypt a set of an identity information (ID info) to generate a set of electronic digital signature (EDS). The second cryptographic algorithm is preferably an RSA algorithm, a DSA algorithm, an ECDSA algorithm, an ECC algorithm, a HMAC algorithm, an MD5 algorithm, an MD4 algorithm, an MD2 algorithm, an SHA-1 algorithm, an SHA-2 algorithm, an SHA-3 algorithm, a RIPEMD-160 algorithm, an MDC-2 algorithm, a GOST R 34. 11-94 algorithm, a BLAKE2 algorithm, a Whirlpool algorithm, an SM3 algorithm, a PRNG algorithm, a TRNG algorithm, or a combination thereof. The second cryptographic algorithm is preferably used to generate the electronic digital signature. The second cryptographic algorithm is preferably also used to further obfuscate the ephemeral decryption key and is also known as a hash or hashing encryption algorithm.

In one embodiment, the identity information preferably includes numbers, words, characters, alphabets, symbols, icons, or a combination thereof. For example, the form of the identity information includes, but is not limited to: a two-dimensional quick response code (QR code), a private key, a combination code, an ID code, etc. In one embodiment, the identity information is a simple multi-digit numeric combination code, such as a six-digit numeric combination code.

In one embodiment, a preferred form of the identity information is a personal identification number (PIN). The identity information may also be integrated with or referred to as a Self-Sovereign Identity (SSI), namely the digital identity in the context of Web 3.0, and is also commonly referred to as a digital identity or an identity code (ID code).

The electronic digital signature is generated in the user equipment 100, a scrambling process is implemented in the user equipment 100. The scrambling process transforms the first ephemeral scrambled key into the second ephemeral scrambled key based on the first ephemeral scrambled key.

After the second ephemeral scrambled key is generated in the user equipment 100, the third cryptographic algorithm based on the second ephemeral decryption key is implemented in the user equipment 100 to further encrypt the electronic digital signature to generate an authentication token. The third cryptographic algorithm is preferably an AES algorithm, an RSA algorithm, a DSA algorithm, a HMAC algorithm, an MD5 algorithm, an MD4 algorithm, an MD2 algorithm, an SHA-1 algorithm, an SHA-2 algorithm, an SHA-3 algorithm, a Blowfish algorithm, a Chacha20 algorithm, a Polygon123 algorithm, a Polygon143 algorithm, a Poly1305 algorithm, a SEED algorithm, a CAST-128 algorithm, a DES algorithm, an IDEA algorithm, an RC2 algorithm, an RC4 algorithm, an RC5 algorithm, an SM4 algorithm, a TDES algorithm, and a GOST 28147-89 algorithm, or a combination thereof. The third cryptographic algorithm is also referred to as a secure encryption algorithm, preferably a symmetric encryption algorithm.

Next, the generated first and second ephemeral decryption keys are released to the security serving equipment 300. The third security middleware program module installed on the security serving equipment 300 then generates a token index based on the first and second ephemeral decryption keys. The token index is of a minimum content, or a strictly smaller portion, sufficient to extract the information regarding the first and second ephemeral decryption keys. Next, the user equipment 100 requests the corresponding token index from the security serving equipment 300 and retrieves the token index. For example, the forms of the first and second ephemeral decryption keys are preferably a symbol string or a two-dimensional quick response code having a length of 256 binary bits.

Next, the authentication information inputted by the user, the identity information, the generated authentication token and the retrieved token index are further processed to be combined in the user equipment 100 to form a set of ephemeral strings. The combined ephemeral strings are then released from the user equipment 100 to the network application serving device 200 via the first transmission connection P1 or the transmission connection P4.

In the network application serving device 200, when a second security middleware program module installed in the network application server device 200 receives the ephemeral strings, the ephemeral strings are further parsed to obtain the identity information, the authentication information, including the username, password, and passcode, the token index, and the authentication token, from the ephemeral strings. Preferably, the parsing process does not require the implementation of cryptographic encryption or decryption computations. Then the acquired token index is transmitted from the network application serving device 200 to the security serving equipment 300 via either an encrypted mode or an unencrypted mode, to claim for and receive the corresponding first and second ephemeral decryption keys stored in the security serving device 300. Alternatively, the network application serving device 200 requests the security serving device 300 to retrieve the corresponding first and second ephemeral decryption keys. According to the received token index, the security serving device 300 sends the corresponding first and second ephemeral decryption keys to the network application serving device 200.

Next, in the network application serving device 200, the second security middleware program module executes the third cryptographic algorithm based on the received second ephemeral decryption key, to decrypt the authentication token into an electronic digital signature. Then, a signature authentication process is implemented based on the first ephemeral decryption key to verify whether the decrypted electronic digital signature is valid against a certain digital signing algorithm such as ECDSA and/or that it has not been altered and/or it is a response that successfully satisfies a challenge phrase or challenge message.

Meanwhile, in the network application serving device 200, the second security middleware program module performs the identity information authentication process for the acquired identity information to authenticate whether the set of the identity information correctly matches the record in the database. Meanwhile, in the network application serving device 200, the second security middleware program module performs the username password authentication process for the acquired username and password to verify whether the set of the username and password correctly matches each other. While it could be argued that the said digital signature authentication procedure by itself is sufficient for high confidence secure log in gating, such that the conventional username/password matching check may be unnecessary, in the spirit of multi-party and multi-factor dynamic strong encryption authentication according to the present invention it positively contributes to highten the degree of log in security as they serve independent verification factors.

After the signature authentication process, the identity information authentication process, and the username password authentication process are accomplished, the network application serving device 200 returns the authentication results to the user equipment 100. Only if the signature authentication process, the identity information authentication process, and the username password authentication process confirm that the authentication results are all correct, the user is allowed to log in and access the application service provided by the network application serving device 200 via the user equipment 100, otherwise the user is denied to log in to the application service.

Selectively, even though the signature authentication process, the identity information authentication process and the username password authentication process confirm that the authentication results are all correct, the second security middleware program module may selectively transmit an additional authentication code to the user equipment 100, and require the user to input the received authentication code into the first security middleware program module. Only if the inputted authentication code is correctly verified is the user allowed to log in and access the application service in the network application serving device 200 via the user equipment 100.

After all the authentication processes are implemented, the first, second, and third security middleware program modules automatically delete the first and second ephemeral decryption keys temporarily stored in the user equipment 100, the network application serving device 200 and the security serving equipment 300, and the username, the password, the passcode, the electronic digital signature, the authentication token, the ephemeral strings and the token index temporarily stored in the user equipment 100 and the network application serving device 200.

In one embodiment, the third cryptographic algorithm may be implemented in the user equipment 100 or the network application serving device 200 rather than in the security serving equipment 300, to better achieve the effect of edge computing. The passcode is only temporarily stored in the user equipment 100 and the network application serving device 200, but is not stored in the security serving equipment 300. In addition, only the first and second ephemeral decryption keys are temporarily stored in the security serving equipment 300, and the user's authentication information is not transmitted to the security serving equipment 300 which has a much higher cyber security risk.

Figure 4:
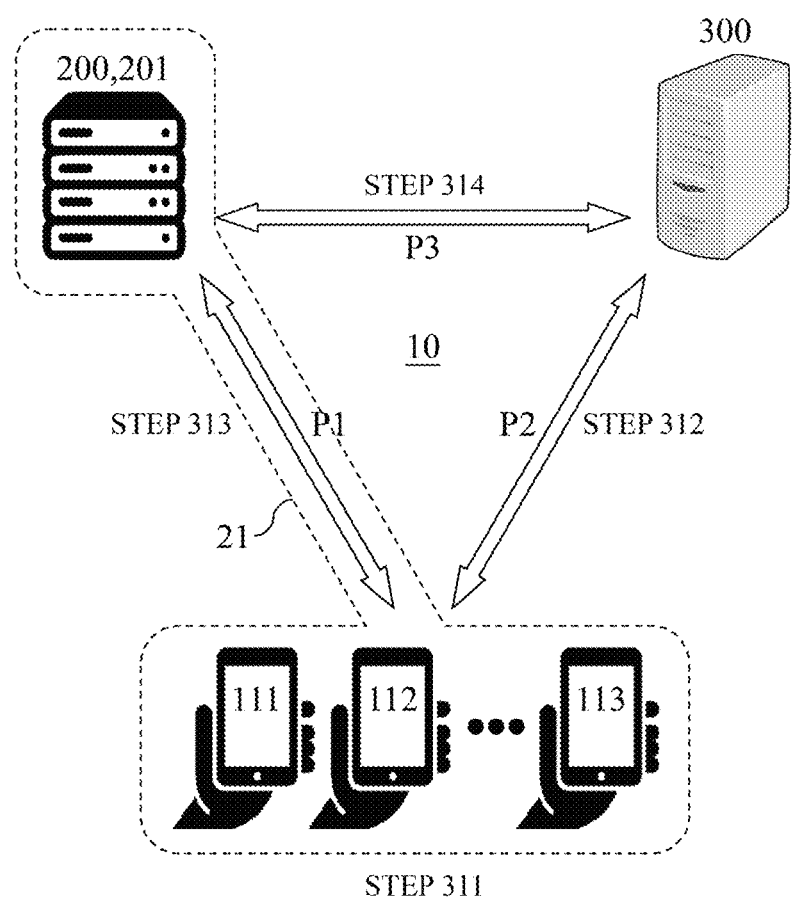
FIG. 4 is a system architecture diagram illustrating the fourth embodiment for the cyber security system based on multi-party and multi-factor dynamic strong encryption authentication according to the present invention.

FIG. 4 is a system architecture diagram illustrating the fourth embodiment for the cyber security system based on multi-party and multi-factor dynamic strong encryption authentication according to the present invention. The fourth embodiment is based on the first embodiment to the third embodiment, and includes all the technical features of the first embodiment to the third embodiment. In one embodiment, the cyber security system 10 based on multi-party and multi-factor dynamic strong encryption authentication according to the present invention is integrated into the current framework for the lightweight directory access protocol (LDAP) framework.

In terms of the current framework for LDAP technology, it may not be sufficient to resist hacker attacks. Taking the campus as an example, most of the current campus online application services are established based on the LDAP framework and only rely on a password authentication means to authenticate users. However, at present, more and more campus data, such as students' personal information, students' grades, course records, and graduation certificates, are uploaded to the cloud server for data storage via the Internet. Therefore, the cyber security for campus online application services needs to be improved to well protect students' personal information and campus data.

When the cyber security system 10 based on multi-party and multi-factor dynamic strong encryption authentication according to the present invention is integrated into the LDAP framework, the cyber security system 10 based on multi-party and multi-factor dynamic strong encryption authentication includes at least multiple smart phones 111, 112 and 113 operated by users, an LDAP client server 201 acting as a network application serving device 200, and the security serving equipment 300. These three devices establish transmission connections with one another over the Internet to exchange messages and information.

In one embodiment, the network application serving device 200 is preferably a first-type device of Internet application server, such as an Internet contents provider server. The user equipment 100 preferably establishes a transmission connection P1 with the network application serving device 200 directly through one or more segments of the network consisting of the local area network or the Internet without passing through other network devices. The first transmission connection P1, the second transmission connection P2 and the third transmission connection P3, may preferably be an unencrypted, unsecured, or untrusted transmission connection.

In one embodiment, the cyber security system 10 based on multi-party and multi-factor dynamic strong encryption authentication further includes a subnetwork 21. The subnetwork 21 preferably consists of the LDAP client server 201 and the smart phones 111, 112 and 113. The subnetwork 21 is the current framework of LDAP. Accordingly, the present invention is seamlessly incorporated into the current LDAP framework, and only a third-party security serving equipment 300 is added to the subnetwork 21, which is a conventional LDAP framework.

By adding the multi-factor identity authentication technology according to the present invention into the current LDAP framework, the cyber security protection for the LDAP system is effectively improved. The user's identity is verified and authenticated through multi-factor authentication technology.

The present invention further performs, such as, dynamic strong encryption digital signature systems and symmetric encryption technologies, such as, ECDSA, SHA-256 and AES256 encryption technology, based on multiple scrambling processes, to generate a one-time authentication token. Then the one-time authentication token is authenticated by at least three devices including the user equipment 100, the network application serving device 200 and the security serving equipment 300. The user's personal information and data are encrypted and transmitted to ensure cyber security for the user's personal information and data. The security serving device 300 only performs identity authentication and does not interfere with user privacy.

In the current trend of digital transformation, with rampant hackers, the world is increasingly focusing on cyber security and privacy protection, while promoting the Zero Trust Architecture (ZTA) network security strategy. The cyber security method according to the present invention has the capability to seamlessly integrate into any existing network architecture, thereby enhancing security measures. The cyber security method according to the present invention can strengthen the security of data transmission for network users and prevent losses caused by attacks such as man-in-the-middle and phishing.

In one embodiment, the implementation sequences among the user equipment 100, the network application serving device 200, and the security serving equipment 300 are further addressed as follows.

STEP 311: The user enters his or her username and password and passcode into the user equipment 100, wherein the passcode include, but are not limited to: private key, QR code, ID code, and PIN code. The system 10 then correspondingly generates an ephemeral decryption key and a single sign-on authentication token (SSO token) in the user equipment 100.

STEP 312: The generated ephemeral decryption key is transmitted from the user equipment 100 to the secure serving equipment 300.

STEP 313: The username and password inputted by the user and the generated SSO token are all transmitted to the network application serving device 200.

STEP 314: The network application serving device 200 requests the ephemeral decryption key from the security serving equipment 300 to self-decrypt and authenticate the SSO token.

The cyber security method according to the present invention is preferably reduced to practice in a form of an application program or software, such as, an SDK file or an embedded callable API execution file, and installed in the user equipment 100 including the smart phones 111-113, the network application serving device 200, and the security serving equipment 300, respectively. By using the AES-256 encryption, the instant ephemeral avatar/token, and the ultra-high strength/fast dynamic authentication technology, the presently invented method can be easily integrated and imported into the currently existing various online application service systems to enhance user identity security protection.

The cyber security method and system according to the present invention is a multi-factor passwordless authentication system or a multi-factor passwordless dynamic strong encryption authentication cyber security system. It provides a quantum-level cyber security protection technology platform that can be compatible with and directly integrated into any existing network architectures in various technical fields and industrial fields, especially without substantial modification or correction of the current network architecture. It is applicable to various fields, including but not limited to: manufacturing industry, information and communication industry (ICT), electronics industry, medical care industry, long-term care industry, etc. It is also applicable to all kinds of existing old and new equipment, especially legacy equipment, to enhance cyber security protection. In addition, it has other advantages as follows.

(1) PKI-grade unique quantum-resistant cyber security communication technologies by combining AES256+ECC256 encryption technologies.

(2) A traditional legacy account password system is instantly upgraded to a cutting-edge quantum-level cyber security multi-factor account password system, and the authentication information is not vulnerable to hacking or phishing.

(3) Integrable and compatible with other IoT systems to easily enhance cyber security protection.

The presently invented technology is a cyber security method based on identity identification-and-authentication, including: requiring input of an identity code on the user's equipment in response to the user's login operation; taking out the identity information from the encrypted vault in response to the input of the identity code, randomly generating a ephemeral decryption key, and transmitting it to the security serving equipment; encrypting the identity information based on the ephemeral decryption key to generate a one-time login certificate, and transmitting the one-time login certificate to the security serving equipment; transmitting the one-time login certificate to the network application serving device from the user equipment end, accessing the security serving equipment at the network application serving device end to obtain the necessary information; then performing identity authentication by itself to complete the structure of the three-party identity authentication structure; and authorizing an access right for the user device to proceed with subsequent access after the identity authentication is completed.

Figure 5:
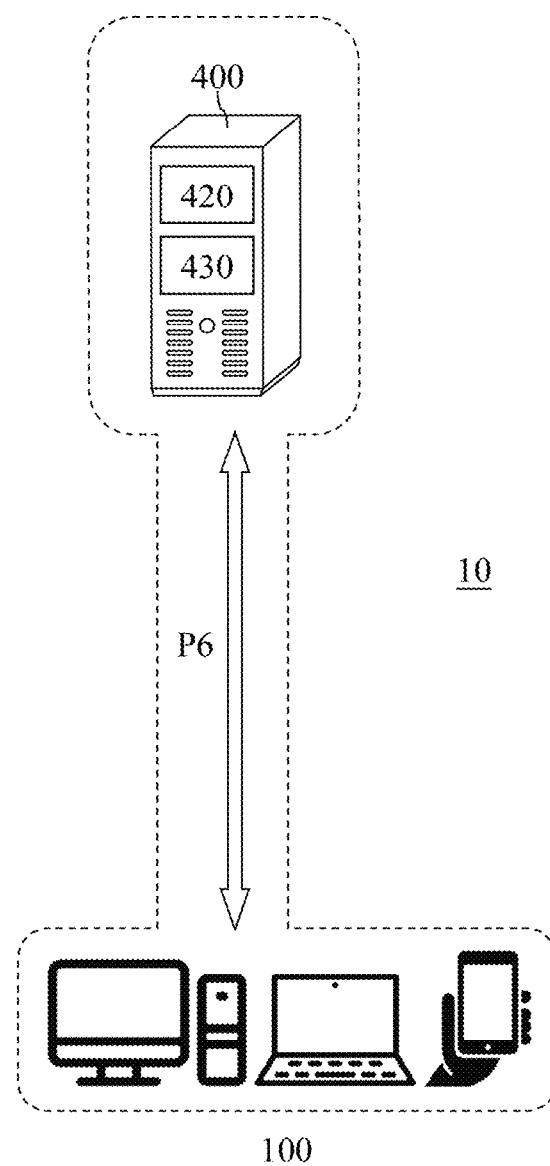
FIG. 5 is a system architecture diagram illustrating the fifth embodiment for the cyber security system based on multi-party and multi-factor dynamic strong encryption authentication according to the present invention.

FIG. 5 is a system architecture diagram illustrating the fifth embodiment for the cyber security system based on multi-party and multi-factor dynamic strong encryption authentication according to the present invention. The fifth embodiment is based on blending the first embodiment to the fourth embodiment, and includes all the technical features in the first embodiment to the fourth embodiment. In this system architecture, the network application serving device (the second device) and the security serving equipment (the third device) are integrated into one single cloud server.

In one embodiment, the cyber security system 10 based on multi-party and multi-factor dynamic strong encryption authentication includes the user equipment 100 and the cloud server (the fourth device) 400. The user equipment 100 and the cloud server 400 are communicatively connected through the sixth transmission connection P6. The network application serving device (the second device) and the security serving equipment (the third device) are integrated into the same cloud server 400. The cloud server 400 includes a second device programming module 420 and a third device programming module 430. The second device programming module 420 and third device programming module 430 are used to simulate full functions of the network application serving device (200) and the security serving equipment (300), respectively, independently of each other. The above system architecture for the cyber security system 10 is used to implement a cyber security method based on multi-party and multi-factor dynamic strong encryption authentication.

FIG. 6 is a flow chart illustrating multiple implementation steps for implementing the cyber security method based on multi-party and multi-factor dynamic strong encryption authentication according to the present invention. In summary, the cyber security method 500 based on multi-party and multi-factor dynamic strong encryption authentication according to the present invention preferably includes but is not limited to the following steps: in the user equipment: randomly generating an ephemeral decryption key in response to an input of an authentication information (STEP 501); transmitting the ephemeral decryption key to a security serving equipment and retrieving a token index from the security serving equipment (STEP 502); encrypting an identity information to generate an electronic digital signature based on a part of the ephemeral decryption key to generate an authentication token accordingly (STEP 503); combining the authentication information, the identity information, the token index and the authentication token selectively to form an ephemeral string and sending the ephemeral string to a second device (STEP 504); in the network application serving device: acquiring the authentication information, the identity information, the token index and the authentication token by receiving and parsing the ephemeral string and requesting to retrieve the ephemeral decryption key from the third device based on the token index (STEP 505); decrypting the authentication token and verifying the electronic digital signature based on the ephemeral decryption key (STEP 506).

There are further embodiments provided as follows.

Embodiment 1: A cyber security method includes: in a first device: randomly generating an ephemeral decryption key in response to an input of an authentication information; transmitting the ephemeral decryption key to a third device and retrieving a token index from the third device; encrypting an identity information to generate an electronic digital signature based on a part of the ephemeral decryption key to generate an authentication token accordingly; and combining the authentication information, the identity information, the token index and the authentication token selectively to form an ephemeral string and sending the ephemeral string to a second device; and in the second device: acquiring the authentication information, the identity information, the token index and the authentication token by receiving and parsing the ephemeral string and requesting to retrieve the ephemeral decryption key from the third device based on the token index; and decrypting the authentication token and verifying the electronic digital signature based on the ephemeral decryption key.

Embodiment 2: The cyber security method as described in Embodiment 1, further includes one of: in the first device: selectively inputting a passcode in response to a request to log in to a network application, wherein the authentication information comprises a username, a password and the passcode comprises one of a digit, a number, a word, a character, an alphabet, a symbol, an icon, a private key, a combo code, a two-dimensional quick response code, an identity code, and a combination thereof; and selectively inputting an passcode in response to the input of the authentication information and randomly generating a first ephemeral decryption key; implementing a scrambling process to generate a second ephemeral decryption key based on a part of the first ephemeral decryption key; encrypting the identity information to generate the electronic digital signature based on the second ephemeral decryption key to generate the authentication token; and transmitting the first ephemeral decryption key and the second ephemeral decryption key to the third device.

Embodiment 3: The cyber security method as described in Embodiment 2, further includes one of: in the second device: implementing a username password authentication process to verify whether the username matches with the password correctly; implementing an identity information authentication process to verify whether the identity information matches with a record in a database correctly; implementing a signature authentication process to verify whether the electronic digital signature is correctly signed and not altered; and accepting the request to log in to the network application when one of authentication results of the username password authentication process, the identity information authentication process and the signature authentication process is correct.

Embodiment 4: The cyber security method as described in Embodiment 3, further includes one of: in the first device: implementing a first cryptographic algorithm to generate the first ephemeral decryption key based on either the authentication information or the passcode selectively; implementing the first cryptographic algorithm to generate the first ephemeral decryption key randomly; implementing a second cryptographic algorithm based on the first ephemeral decryption key to encrypt the identity information to generate the electronic digital signature; implementing a third cryptographic algorithm based on the second ephemeral decryption key to encrypt the electronic digital signature to generate the authentication token; and in the third device: generating the token index based on either the first ephemeral decryption key or the second ephemeral decryption key.

Embodiment 5: The cyber security method as described in Embodiment 4, further includes one of: in the second device: implementing the third cryptographic algorithm based on the second ephemeral decryption key to decrypt the authentication token to acquire the electronic digital signature; implementing the second cryptographic algorithm based on the first ephemeral decryption key to decrypt the electronic digital signature to acquire the identity information; and verifying the electronic digital signature based on the first ephemeral decryption key to verify whether the electronic digital signature is correctly signed and altered.

Embodiment 6: The cyber security method as described in Embodiment 5, further includes one of: in the first device, the second device and the third device: deleting the first ephemeral decryption key and the second ephemeral decryption key stored in the first device, the second device and the third device permanently, when implementations of the username password authentication process, the identity information authentication process and the signature authentication process are accomplished; and in the first device and the second device: deleting the authentication information, the electronic digital signature, the authentication token, the token index and the ephemeral string stored in the first device and the second device permanently, when implementations of the username password authentication process, the identity information authentication process and the signature authentication process are accomplished.

Embodiment 7: The cyber security method as described in Embodiment 4, wherein the first cryptographic algorithm is one selected from an RSA algorithm, a DSA algorithm, an MD5 algorithm, an MD4 algorithm, an MD2 algorithm, an SHA-1 algorithm, an SHA-2 algorithm, an SHA-3 algorithm, a RIPEMD-160 algorithm, an MDC-2 algorithm, a GOST R 34.11-94 algorithm, a BLAKE2 algorithm, a Whirlpool algorithm, an SM3 algorithm, a PRNG algorithm, a TRNG algorithm, and a combination thereof, the second cryptographic algorithm is one selected from an RSA algorithm, a DSA algorithm, an ECDSA algorithm, an ECC algorithm, a HMAC algorithm, an MD5 algorithm, an MD4 algorithm, an MD2 algorithm, an SHA-1 algorithm, an SHA-2 algorithm, an SHA-3 algorithm, a RIPEMD-160 algorithm, an MDC-2 algorithm, a GOST R 34.11-94 algorithm, a BLAKE2 algorithm, a Whirlpool algorithm, an SM3 algorithm, a PRNG algorithm, a TRNG algorithm, and a combination thereof, and the third cryptographic algorithm is one selected from an AES algorithm, an RSA algorithm, a DSA algorithm, a HMAC algorithm, an MD5 algorithm, an MD4 algorithm, an MD2 algorithm, an SHA-1 algorithm, an SHA-2 algorithm, an SHA-3 algorithm, a Blowfish algorithm, a Chacha20 algorithm, a Polygon123 algorithm, a Polygon143 algorithm, a Poly1305 algorithm, a SEED algorithm, a CAST-128 algorithm, a DES algorithm, an IDEA algorithm, an RC2 algorithm, an RC4 algorithm, an RC5 algorithm, an SM4 algorithm, a TDES algorithm, and a GOST 28147-89 algorithm, and a combination thereof.

Embodiment 8: The cyber security method as described in Embodiment 1, wherein the first device and the second device are communicatively connected through a first transmission connection, the first device and the third device are communicatively connected through a second transmission connection, the third device and the second device are communicatively connected through a third transmission connection, and the first transmission connection, the second transmission connection and the third transmission connection are one of a secure transmission connection, an unsecure transmission connection, a trusted transmission connection, an untrusted transmission connection, an encrypted transmission connection and an unencrypted transmission connection, and the first transmission connection and the second transmission connection are preferably an out-of-band channel.

Embodiment 9: The cyber security method as described in Embodiment 1, wherein the first device is selected from one of a desktop computer, a personal computer, a notebook computer, a smart phone, a table device and a mobile device, the second device is selected from one of a small cell, a router, a hub, a switch, a bridge, a gateway, a brouter, a relay, a repeater, an edge server, a microcontroller, a processor, an automated teller machine, a point of sale machine, a PC workstation, a machine tool, a programmable logic controller, an unmanned vehicle, an IP cam, a satellite phone, a CAN bus node, a network address translation, a network application server, an application service provider server, an Internet contents provider server, an Internet service provider server, a virtual machine server, a serverless Lambda function device, a CAN bus main node, a factory main node and a cloud server, and the third device is selected from one of a security intermediary server and a cloud server.

Embodiment 10: A cyber security system, includes: a third device; a first device configured to: randomly generate an ephemeral decryption key in response to an input of an authentication information; transmit the ephemeral decryption key to a third device and retrieve a token index from the third device; encrypt an identity information to generate an electronic digital signature based on a part of the ephemeral decryption key to generate an authentication token accordingly; and combine the authentication information, the identity information, the token index and the authentication token selectively to form an ephemeral string and send the ephemeral string to a second device; and the second device configured to: acquire the authentication information, the identity information, the token index and the authentication token by receiving and parsing the ephemeral string and request to retrieve the ephemeral decryption key from the third device based on the token index; and decrypt the authentication token and verify the electronic digital signature based on the ephemeral decryption key.

Embodiment 11: A cyber security system, includes: a fourth device comprising a second device programing module and a third device programing module; a first device communicatively connected with the fourth device and configured to: randomly generate an ephemeral decryption key in response to an input of an authentication information; transmit the ephemeral decryption key to a third device programing module and retrieve a token index from the third device programing module; encrypt an identity information to generate an electronic digital signature based on a part of the ephemeral decryption key to generate an authentication token accordingly; and combine the authentication information, the identity information, the token index and the authentication token selectively to form an ephemeral string and send the ephemeral string to a second device; and the fourth device configured to acquire the authentication information, the token index or the authentication token by parsing the ephemeral string by the second device programming module; request to retrieve the ephemeral decryption key from the third device programming module based on the token index by the second device programming module; and decrypt the authentication token and verify the electronic digital signature based on the ephemeral decryption key by the second device programming module.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A cyber security method, comprising:
   in a first device:
   randomly generating a first ephemeral decryption key in response to an input of an authentication information;
   encrypting an identity information based on the first ephemeral decryption key to generate an electronic digital signature;
   randomly generating a second ephemeral decryption key;
   encrypting the electronic digital signature based on the second ephemeral decryption key to generate an authentication token;
   transmitting the first ephemeral decryption key and the second ephemeral decryption key to a third device and retrieving a token index from the third device, wherein the token index is generated by the third device and refers to a strictly smaller portion that is sufficient to retrieve the first and second ephemeral decryption keys from the third device;
   combining the authentication information, the identity information, the token index and the authentication token to form an ephemeral string and sending the ephemeral string to a second device;
   in the second device:
   acquiring the authentication information, the identity information, the token index and the authentication token by receiving and parsing the ephemeral string;
   requesting to retrieve the first ephemeral decryption key and the second ephemeral decryption key from the third device based on the token index;
   decrypting the authentication token based on the second ephemeral decryption key to obtain the electronic digital signature;
   verifying whether the electronic digital signature is correctly encrypted and not altered during the above transmitting and retrieving based on the first ephemeral decryption key; and
   decrypting the electronic digital signature based on the first ephemeral decryption key to obtain the identity information, if the electronic digital signature is correctly encrypted and not altered.

2. The cyber security method as claimed in claim 1, wherein the authentication information comprises a username and a password.

3. The cyber security method as claimed in claim 2, further comprising:
in the second device:
implementing a username password authentication process to verify whether the username matches with a registered username and the password matches with a registered password correctly;
implementing an identity information authentication process to verify whether the identity information matches with a record in a database correctly;
implementing a signature verification process based on the first ephemeral decryption key to verify whether the electronic digital signature is correctly encrypted and not altered during the above transmitting and retrieving; and
accepting the request to log in to the network application when one of authentication results of the username password authentication process, the identity information authentication process and the signature authentication process is correct.

4. The cyber security method as claimed in claim 3, further comprising:
in the first device:
implementing a first cryptographic algorithm to generate the first ephemeral decryption key randomly;
implementing a second cryptographic algorithm based on the first ephemeral decryption key to encrypt the identity information to generate the electronic digital signature;
implementing a third cryptographic algorithm based on the second ephemeral decryption key to encrypt the electronic digital signature to generate the authentication token; and
in the third device:
generating the token index based on the first ephemeral decryption key and the second ephemeral decryption key.

5. The cyber security method as claimed in claim 4, further comprising:
in the second device:
implementing the third cryptographic algorithm based on the second ephemeral decryption key to decrypt the authentication token to acquire the electronic digital signature;
implementing the second cryptographic algorithm based on the first ephemeral decryption key to decrypt the electronic digital signature to acquire the identity information; and
verifying the electronic digital signature based on the first ephemeral decryption key to verify whether the electronic digital signature is correctly encrypted.

6. The cyber security method as claimed in claim 5, further comprising:
in the first device, the second device and the third device:
deleting the first ephemeral decryption key and the second ephemeral decryption key stored in the first device, the second device and the third device permanently, when implementations of the username password authentication process, the identity information authentication process and the signature authentication process are accomplished; and
in the first device and the second device:
deleting the authentication information, the electronic digital signature, the authentication token, the token index and the ephemeral string stored in the first device and the second device permanently, when implementations of the username password authentication process, the identity information authentication process and the signature authentication process are accomplished.

7. The cyber security method as claimed in claim 4, wherein the first cryptographic algorithm is one selected from an RSA algorithm, a DSA algorithm, an MD5 algorithm, an MD4 algorithm, an MD2 algorithm, an SHA-1 algorithm, an SHA-2 algorithm, an SHA-3 algorithm, a RIPEMD-160 algorithm, an MDC-2 algorithm, a GOST R 34.11-94 algorithm, a BLAKE2 algorithm, a Whirlpool algorithm, an SM3 algorithm, a PRNG algorithm, a TRNG algorithm, and a combination thereof, the second cryptographic algorithm is one selected from an RSA algorithm, a DSA algorithm, an ECDSA algorithm, an ECC algorithm, a HMAC algorithm, an MD5 algorithm, an MD4 algorithm, an MD2 algorithm, an SHA-1 algorithm, an SHA-2 algorithm, an SHA-3 algorithm, a RIPEMD-160 algorithm, an MDC-2 algorithm, a GOST R 34.11-94 algorithm, a BLAKE2 algorithm, a Whirlpool algorithm, an SM3 algorithm, a PRNG algorithm, a TRNG algorithm, and a combination thereof, and the third cryptographic algorithm is one selected from an AES algorithm, an RSA algorithm, a DSA algorithm, a HMAC algorithm, an MD5 algorithm, an MD4 algorithm, an MD2 algorithm, an SHA-1 algorithm, an SHA-2 algorithm, an SHA-3 algorithm, a Blowfish algorithm, a Chacha20 algorithm, a Polygon123 algorithm, a Polygon143 algorithm, a Poly1305 algorithm, a SEED algorithm, a CAST-128 algorithm, a DES algorithm, an IDEA algorithm, an RC2 algorithm, an RC4 algorithm, an RC5 algorithm, an SM4 algorithm, a TDES algorithm, and a GOST 28147-89 algorithm, and a combination thereof.

8. The cyber security method as claimed in claim 1, wherein the first device and the second device are communicatively connected through a first transmission connection, the first device and the third device are communicatively connected through a second transmission connection, the third device and the second device are communicatively connected through a third transmission connection, and the first transmission connection, the second transmission connection and the third transmission connection are one of a secure transmission connection, an unsecure transmission connection, a trusted transmission connection, an untrusted transmission connection, an encrypted transmission connection and an unencrypted transmission connection, and the first transmission connection and the second transmission connection are an out-of-band channel.

9. The cyber security method as claimed in claim 1, wherein the first device is selected from one of a desktop computer, a personal computer, a notebook computer, a smart phone, a table device and a mobile device, the second device is selected from one of a small cell, a router, a hub, a switch, a bridge, a gateway, a brouter, a relay, a repeater, an edge server, a microcontroller, a processor, an automated teller machine, a point of sale machine, a PC workstation, a machine tool, a programmable logic controller, an unmanned vehicle, an IP cam, a satellite phone, a CAN bus node, a network address translation, a network application server, an application service provider server, an Internet contents provider server, an Internet service provider server, a virtual machine server, a serverless Lambda function device, a CAN bus main node, a factory main node and a cloud server, and the third device is selected from one of a security intermediary server and a cloud server.

10. A cyber security system, comprising:

a third device;

a first device configured to:
- randomly generate a first ephemeral decryption key in response to an input of an authentication information;
- encrypting an identity information based on the first ephemeral decryption key to generate an electronic digital signature;
- randomly generating a second ephemeral decryption key;
- encrypting the electronic digital signature based on the second ephemeral decryption key to generate an authentication token;
- transmit the first ephemeral decryption key and the second ephemeral decryption key to a third device and retrieve a token index from the third device, wherein the token index is generated by the third device and refers to a strictly smaller portion that is sufficient to retrieve the first and second ephemeral decryption keys from the third device; and
- combine the authentication information, the identity information, the token index and the authentication token to form an ephemeral string and send the ephemeral string to a second device; and the second device configured to:
- acquire the authentication information, the identity information, the token index and the authentication token by receiving and parsing the ephemeral string;
- request to retrieve the first ephemeral decryption key and the second ephemeral decryption key from the third device based on the token index;
- decrypt the authentication token based on the second ephemeral decryption key to obtain the electronic digital signature;
- verify whether the electronic digital signature is correctly encrypted and not altered during the above transmitting and retrieving based on the first ephemeral decryption key; and
- decrypt the electronic digital signature based on the first ephemeral decryption key to obtain the identity information, if the electronic digital signature is correctly encrypted and not altered.

* * * * *